A. A. WEIGEL.
ANTIFRICTION BEARING FOR RAILWAY CARS.
APPLICATION FILED JULY 24, 1913.
1,180,350.
Patented Apr. 25, 1916.
2 SHEETS—SHEET 1.
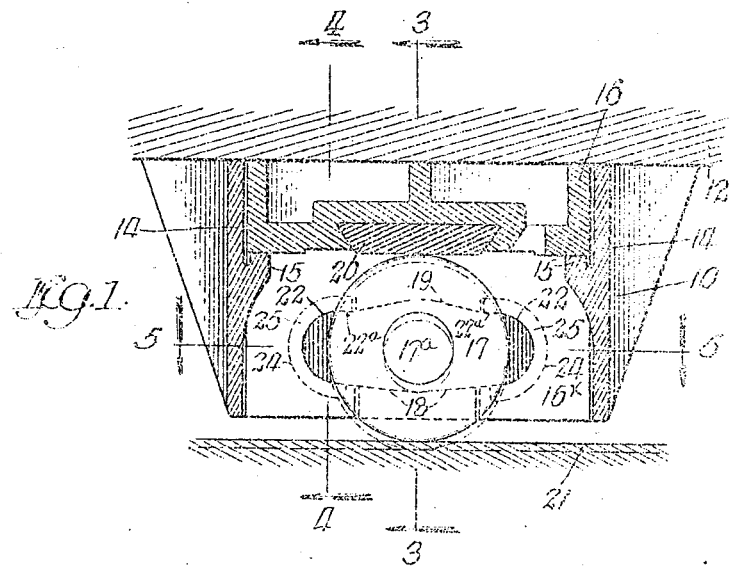
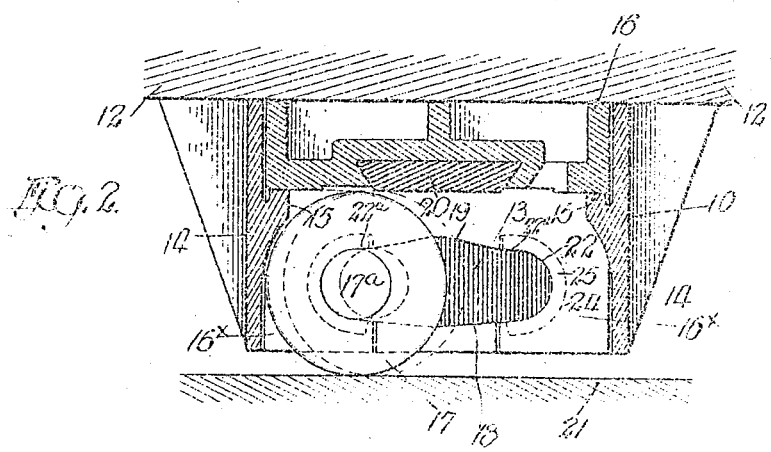

A. A. WEIGEL.
ANTI-FRICTION BEARING FOR RAILWAY CARS.
APPLICATION FILED JULY 24, 1913.
1,180,850. Patented Apr. 25, 1916.
2 SHEETS—SHEET 2.
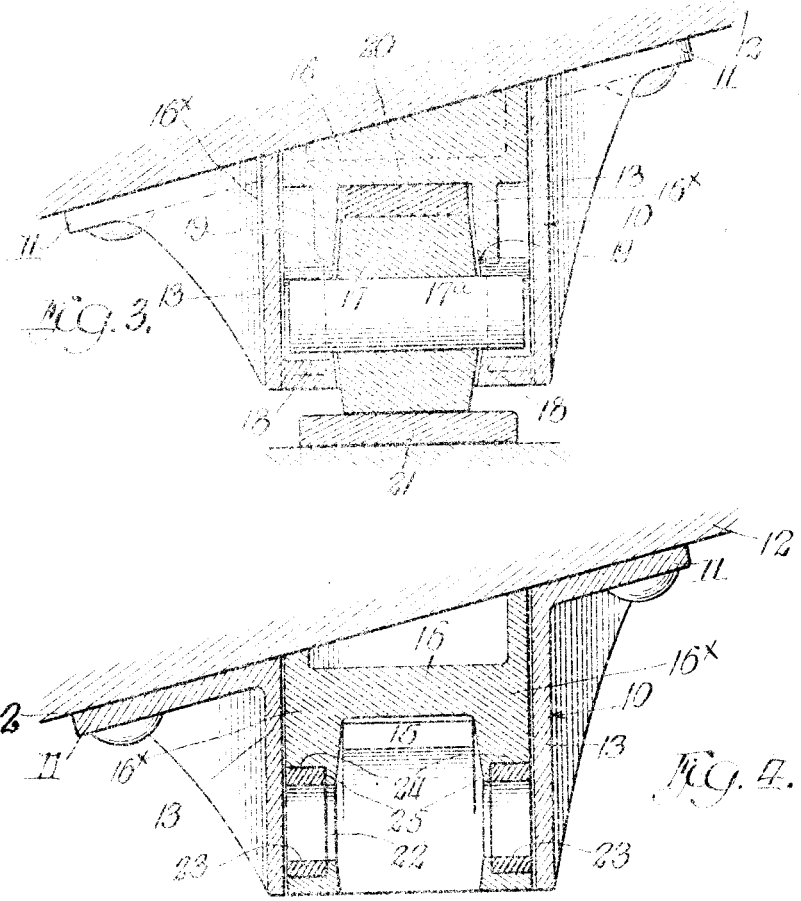
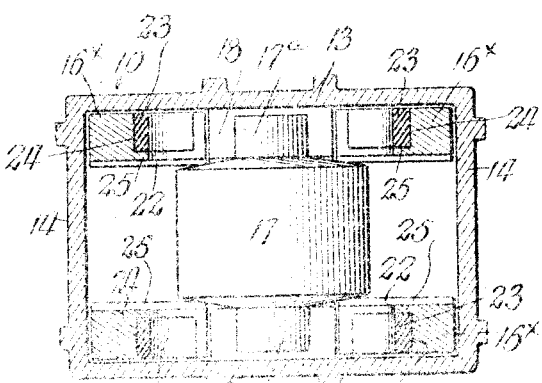

UNITED STATES PATENT OFFICE.

ARNOLD A. WEIGEL, OF CHICAGO, ILLINOIS, ASSIGNOR TO EDWIN S. WOODS, OF CHICAGO, ILLINOIS; ALBERT G. WELCH, EXECUTOR OF SAID WOODS, DECEASED, ASSIGNOR TO ALBERT G. WELCH, TRUSTEE.

ANTIFRICTION-BEARING FOR RAILWAY-CARS.

1,180,350.  Specification of Letters Patent.  Patented Apr. 25, 1916.

Application file July 24, 1913. Serial No. 780,886.

*To all whom it may concern:*

Be it known that I, ARNOLD A. WEIGEL, a citizen of the United States, and a resident of Chicago, in the county of Cook and State of Illinois, have invented certain new and useful Improvements in Antifriction-Bearings for Railway-Cars; and I do hereby declare that the following is a full, clear, and exact description thereof, reference being had to the accompanying drawings, and to the letters of reference marked thereon, which form a part of this specification.

This invention relates to an improvement in antifriction bearings, and is shown herein as applied for use in connection with a side bearing for railway cars. The invention consists of the matters hereinafter described and more particularly pointed out in the appended claims.

The improved bearing, as shown herein, is of that type which includes a carrier or casing and an antifriction element provided with trunnions by means of which it is suspended within the carrier, said carrier having tracks or runways on which the trunnions of the antifriction element roll when the antifriction element is released from load. One objectionable feature heretofore inherent in this type of bearing is that after, in the transmission of the load, the antifriction element has traveled in either direction from its normal central position to the limit of its movement in the casing, any further movement of the bearing as a whole will cause the antifriction element to grind against the end wall of the casing and the top wear-plate with resultant added friction, grinding noise and wear of the antifriction element.

The object of the present invention is to provide an antifriction bearing which is without this objectionable feature.

In the drawings:—Figure 1 is a view representing a longitudinal central section through my improved bearing with the antifriction element shown in the position which it occupies when transmitting load. Fig. 2 is a similar view, showing the position of the antifriction element as it appears when transmitting load after it has reached one end of the limit of its travel. Fig. 3 is a view representing a vertical transverse section through the bearing in a plane indicated by the line 3—3 of Fig. 1. Fig. 4 is a view representing a like section taken in a plane indicated by the line 4—4 of Fig. 1. Fig. 5 is a view representing a horizontal section through Fig. 1 in a plane indicated by the line 5—5 of Fig. 1.

Referring now to that embodiment of my invention shown in the drawings,—10 indicates the casing, which is an oblong, rectangular shell, open top and bottom, and provided with flanges 11, 11 at the top for attachment to the body bolster 12 of a railroad car. The casing, as shown herein, is formed with its top plane inclined to the horizontal, to coincide with the inclined end of the body bolster to which it is attached.

13, 13 indicate the side walls of the casing and 14, 14 the end walls thereof.

16 indicates a filler block which closes the top of the casing and confines the antifriction element therein. Said filler block rests at its ends on transverse horizontal shoulders 15, 15 on the end walls 14, 14 of the casing.

17 indicates an antifriction element having trunnions $17^a$, $17^a$ which bear upon inturned flanges 18, 18 formed at the bottom edges of the side walls 13 of the casing. Said flanges constitute tracks or rails and are inclined downwardly from each direction toward the central normal position of the antifriction element, which is caused by gravity to roll down said rails on its trunnions in a familiar manner, when it is released from load.

The filler block 16 is provided with depending side flanges $16^x$, $16^x$ which are located adjacent to the side walls 13, 13 of the casing. Said flanges provide upper rails 19, 19 which are opposed to the lower rails 18, 18 and act with said lower rails and the side walls of the casing to form longitudinally extending channels to confine the trunnions of the antifriction element.

In the filler block flanges $16^x$, beyond the ends of the rails 18, there are provided semicircular bearing pockets 22, 22. Said semicircular bearing pockets are designed so that their top and bottom parts form continuations of the upper and lower rails, respectively, 19, 18, and are adapted to provide bearings for the roller trunnions 17ª, 17ª, when said roller reaches the ends of its intended path of travel in either direction, said pockets being so fixed that the antifriction element will never come to bear against the end walls of the casing.

The filler block is provided with a wear-plate 20 attached thereto in any convenient or familiar manner and adapted for engagement with the top of the antifriction element when the same is transmitting load. The upper rails 19, 19, are inclined downwardly from the middle of the casing toward each end, that is to say, toward the point where they merge into the upper sides of the bearing pockets 22.

The wear-plate 20 terminates at each end short of the end of the path of travel of the antifriction element so that the antifriction element is released from contact with said wear-plate just shortly prior to reaching either end of its path of travel. The bearing pockets have short horizontal parts 22ª which are intersected by the upper inclined rails 19, 19 that act to guide the trunnions of the antifriction element into said pockets. The centers of the bearing pockets are spaced from the plane of the contact face of the wear-plate a distance equal to the radius of the antifriction element so that there is no vertical movement of the antifriction element (with the resultant rise or fall of the body bolster where the bearing is used as a side bearing) when the antifriction element ceases to bear on the wear-plate and its trunnions come to bear in the pockets 22 and there is one point proximate to each end of the path of travel of the antifriction element where the load is transmitted both from the wear-plate to the body of the antifriction element and from the bearing pockets 22 to the trunnions 17ª, namely, the point at which the trunnions first come to bear against the horizontal parts 22ª of the bearing pockets. After this point is passed the antifriction element rotates in the fixed bearings provided by the pockets 22 without further longitudinal movement in the casing, and as said trunnions are of comparatively small diameter the friction due to said rotation is reduced to a minimum. When released by the lower bearing member 21, the antifriction element will roll on its trunnions down the bottom rails 18 to its normal central position in the usual manner.

To reduce the friction when the antifriction element trunnions 17ª are rotating in the bearing pockets 22, I prefer to provide said pockets with bushings 23 of any suitable metal as, for example, Babbitt metal. As shown, these bearings are placed in semicircular recesses 24 formed in the flanges 16ˣ of the filler-block, said bushings being confined laterally between a rib 25 on the inner face of the filler-block flanges 16ˣ, 16ˣ, left in forming the said recesses and between the adjacent side wall 13 of the casing.

The advantages of my improved antifriction bearing will be apparent to those familiar with the art. The antifriction element is caught before it comes into contact with the end walls of the casing and its trunnions coming to bear in the bearing pockets 22, and its peripheral bearing surface being no longer in engagement with the wear-plate, it may rotate, if necessary, with a minimum of friction and without the grinding noise and frictional wear on its bearing surface as in other bearings of this kind.

While in describing my invention I have referred to certain details of mechanical construction and arrangement, it is to be understood that the invention is in no way limited thereby, except as may be pointed out in the appended claims.

I claim as my invention:—

1. In an antifriction bearing an antifriction element means providing a bearing surface of predetermined length against which said antifriction element may have rolling bearing, and means providing a fixed rotative bearing of reduced radius for said antifriction element beyond the ends of its rolling bearing.

2. In an antifriction bearing an antifriction element means providing a bearing surface of predetermined length against which said antifriction element may have rolling bearing, and means providing a fixed rotative bearing of reduced radius for said antifriction element after it has passed the limits of its rolling bearing.

3. In an antifriction bearing an antifriction element means providing a bearing surface of predetermined length against which said antifriction element may have rolling bearing, means providing a fixed rotative bearing of reduced radius for said antifriction element after it has passed the limits of its rolling bearing, and means acting to prevent vertical displacement of said antifriction element in passing from said rolling bearing to said fixed bearing.

4. In an antifriction bearing an antifriction element, means providing a bearing surface of predetermined length against which said antifriction element may have rolling bearing, and means providing a fixed rotative bearing of reduced radius for said antifriction element after it has passed the ends of its rolling bearing, whereby the load is transmitted to said antifriction element through said fixed bearings when said antifriction element is at the ends of its path of travel.

5. In an antifriction bearing an antifriction element, means providing a bearing surface of predetermined length against which said antifriction element may have rolling bearing, means providing a fixed rotative bearing of reduced radius for said antifriction element at the ends of its path of travel and means for providing rolling bearing for said antifriction element intermediate the ends of said path, said means being constructed to prevent vertical movement of said antifriction element in passing from one bearing to the other.

6. In an antifriction bearing an antifriction element, means providing a bearing surface of predetermined length against which said antifriction element may have rolling bearing, means providing fixed rotative bearings of reduced diameter for said antifriction element beyond the ends of said member and in the plane of travel of said antifriction element, and means for guiding said antifriction element from its rolling bearing to its fixed bearing without vertical displacement.

7. In an antifriction bearing an antifriction element means providing a bearing surface of predetermined length against which said antifriction element may have rolling bearing, said antifriction element being provided with trunnions and means providing a fixed rotative bearing for said trunnions at the ends of the roller bearing of said anti-friction element whereby the load is transmitted to said antifriction element through said trunnions when said antifriction element is at the ends of its path of travel.

8. In an antifriction bearing an antifriction element, means providing a bearing surface of predetermined length against which said antifriction element may have rolling bearing, said antifriction element being provided with trunnions, means providing fixed rotative bearings for said trunnions at the ends of the rolling bearing of said antifriction element whereby the load is transmitted to said antifriction element through said trunnions when said antifriction element is at the ends of its path of travel and means to prevent vertical displacement of said antifriction element in passing from one bearing to the other.

9. In an antifriction bearing an antifriction element, means providing a bearing surface of predetermined length against which said antifriction element may have rolling bearing, said antifriction element being provided with trunnions means providing longitudinally extending tracks to support said trunnions when the antifriction element is not transmitting load, and means providing a fixed bearing for said trunnions at the ends of the path of travel of said antifriction element whereby the load is transmitted to said antifriction element through said trunnions.

10. In an antifriction bearing an antifriction element means providing a bearing surface of predetermined length against which said antifriction element may have rolling bearing, said antifriction element being provided with trunnions means providing longitudinally extending tracks to support said trunnions when the antifriction element is not transmitting load, means providing fixed bearings for said trunnions at the ends of and in the plane of the path of travel of said antifriction element whereby the load is transmitted to said antifriction element through said trunnions, and means to prevent vertical displacement of said antifriction element in passing from one bearing to the other.

11. In an antifriction bearing an antifriction element, means providing a bearing surface of predetermined length against which said antifriction element may have rolling bearing, said antifriction element being provided with trunnions, means providing longitudinally extending channels having upper and lower tracks confining said trunnions, but permitting vertical play of said trunnions therein, and means providing fixed bearings at the ends of said channels for said trunnions whereby the load is transmitted to said antifriction element through said trunnions when the antifriction element is at the ends of its path of travel.

12. In an antifriction bearing, an antifriction element, means providing a bearing surface of predetermined length against which said antifriction element may have rolling bearing, said antifriction element being provided with trunnions, means providing longitudinally extending channels having upper and lower tracks confining said trunnions but permitting vertical play of said trunnions therein, means providing fixed rotative bearings for said trunnions at the ends of said channels whereby the load is transmitted to said antifriction element through said trunnions when it is at the ends of its path of travel, said channels and fixed bearing providing means being constructed to prevent vertical displacement of said antifriction element in passing from one bearing to the other.

13. In an antifriction bearing an antifriction element, means providing a bearing surface of predetermined length against which said antifriction element may have rolling bearing, said antifriction element being provided with trunnions means providing upper and lower longitudinally extending tracks to confine said trunnions, means providing fixed bearings for said trunnions with the centers of the same in the plane of travel of said antifriction elements when in rolling bearing against said bearing surface of predetermined length, said upper rails being inclined downwardly toward said fixed bearings to direct said trunnions thereinto, said fixed bearings and said upper inclined rails being constructed to prevent vertical displacement of said antifriction elements when passing from rolling bearing to fixed bearing.

14. An antifriction bearing comprising a casing open top and bottom, a filler block closing the top of said casing, an antifriction element in said casing, means providing a bearing surface of predetermined length against which said antifriction element may have rolling bearing, said antifriction element being provided with trunnions and said filler block being provided with longitudinally extending flanges, said filler block flanges depending to the bottom of the casing and said casing and filler block flanges being constructed to jointly provide lower rails for the support of the trunnions of said antifriction element.

15. An antifriction element comprising a casing open top and bottom, a filler block closing the top of said casing and being provided with longitudinally extending, depending flanges, an antifriction element in said casing, means providing a bearing surface of predetermined length against which said antifriction element may have rolling bearing, said antifriction element being provided with trunnions, said casing being provided with longitudinally extending rails and said filler block flanges and said rails together defining channels to confine said trunnions, but permitting vertical play of said trunnions therein, said filler block flanges being provided with bearing pockets at the ends of said channels to provide fixed rotative bearings for said trunnions when the antifriction element reaches the ends of its path of travel, whereby the load is transmitted to said antifriction element through said trunnions.

16. An antifriction element comprising a casing open top and bottom, a filler block closing the top of said casing and being provided with longitudinally extending, depending flanges, an antifriction element in said casing and having trunnions, means providing a bearing surface of predetermined length against which said antifriction element may have rolling bearing, said casing being provided with longitudinally extending rails and said filler block flanges and said rails together defining channels to confine said trunnions but permitting vertical play of said trunnions therein, said filler block flanges being provided with bearing pockets at the ends of said channels to provide fixed rotative bearings for said trunnions when the antifriction element reaches the ends of its path of travel, said channels and pockets being constructed to prevent vertical displacement of said antifriction element when passing from one bearing to the other.

17. An antifriction bearing comprising a casing having side walls, a filler block provided with depending flanges located adjacent to said side walls, said flanges being provided with bearing pockets, and bushings for said bearing pockets located in recesses provided about said pockets and each confined between a fixed part of said flange and the adjacent side wall of said casing.

In testimony, that I, claim the foregoing as my invention I affix my signature in the presence of two witnesses, this 14th day of July, A. D. 1913.

ARNOLD A. WEIGEL.

Witnesses:
T. H. ALFREDS,
G. R. WILKINS.